March 9, 1937.  W. W. REECE ET AL  2,073,221
APPARATUS FOR COOLING BAKERY PRODUCTS
Filed Dec. 12, 1931  2 Sheets-Sheet 2
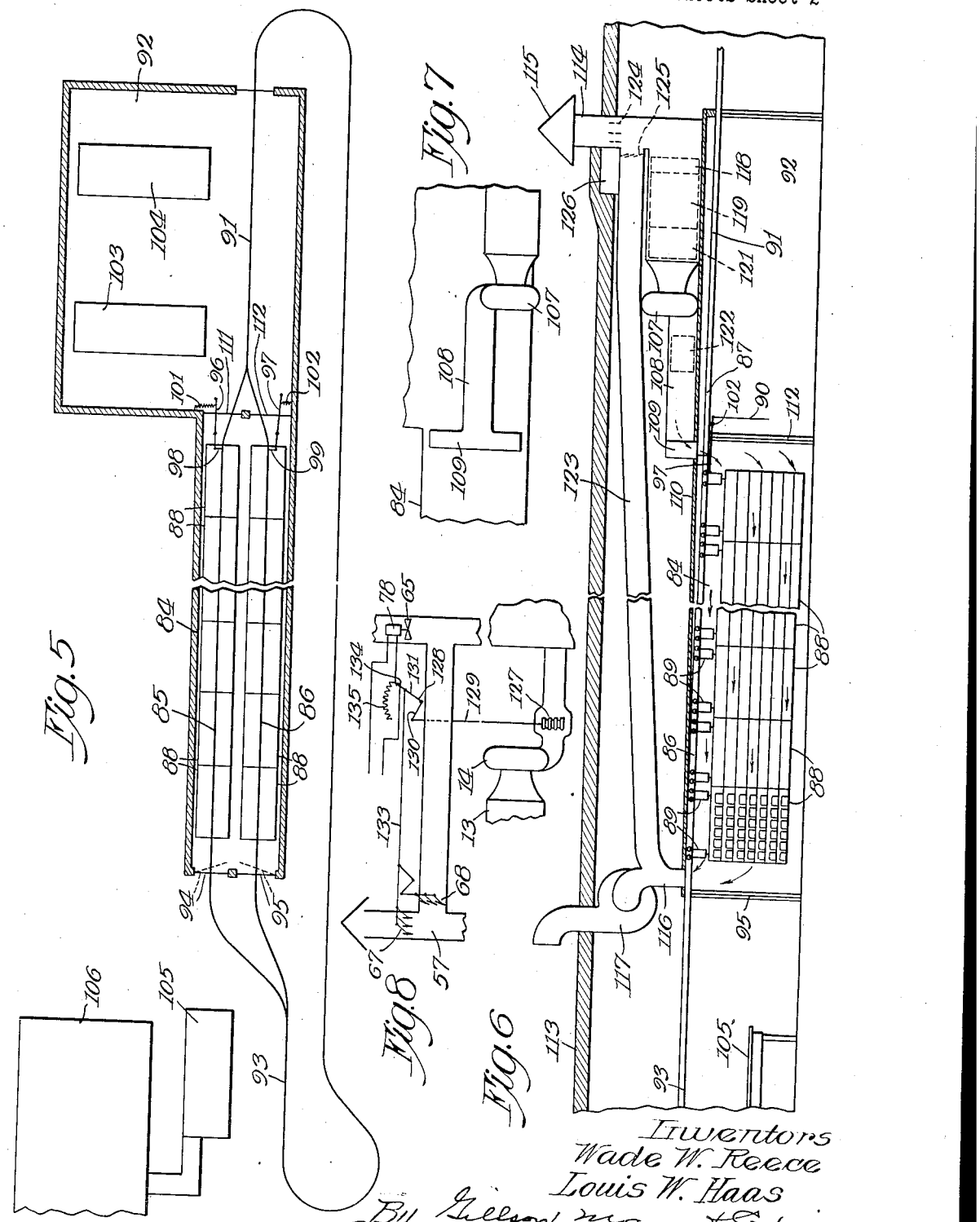
Inventors
Wade W. Reece
Louis W. Haas
By Gillson, Mann &Co
Attys.

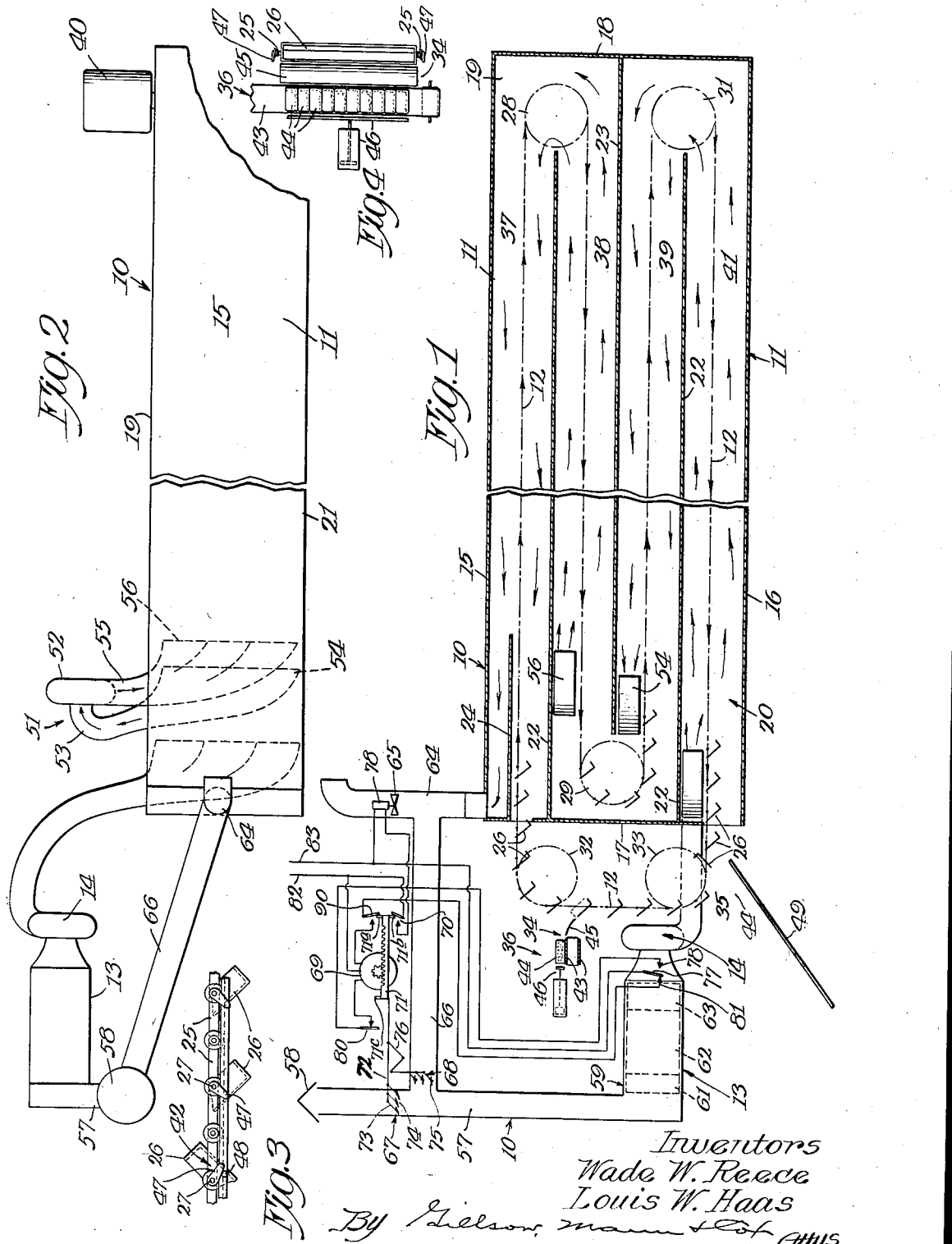

Patented Mar. 9, 1937

2,073,221

UNITED STATES PATENT OFFICE 2,073,221

APPARATUS FOR COOLING BAKERY PRODUCTS

Wade W. Reece and Louis W. Haas, Chicago, Ill., assignors to The W. E. Long Co., a corporation of Illinois Application December 12, 1931, Serial No. 580,561

5 Claims. (Cl. 34—12)

This invention relates to cooling devices, and, more particularly, to apparatus for cooling bakery products and the like.

One of the objects of the invention is the provision of a new and improved apparatus for treating bakery products with conditioned air for standardization of the cooling treatment, thereby insuring a uniform product during all seasons of the year.

Another object of the invention is the provision of a new and improved cooling apparatus for cooling bakery products that is so arranged as to occupy a minimum of space and is provided with novel means for facilitating the air circulation through the system.

A further object of the invention is the provision of new and improved apparatus for cooling bakery products, together with novel means for controlling the air circulating through said apparatus.

Another object of the invention is the provision of a new and improved apparatus for cooling bakery products which is simple in construction, inexpensive to install and efficient in operation.

Other and further objects and advantages will appear from the following description taken in connection with the accompanying drawings, in which—

Fig. 1 is a side elevation of one embodiment of the invention shown more or less diagrammatically with parts broken away;

Fig. 2 is a top plan view thereof;

Fig. 3 is a side elevation of a portion of the endless carrier;

Fig. 4 is a plan view of a portion of the loading mechanism;

Fig. 5 is a horizontal section of a modified form of cooling apparatus with parts in plan, shown more or less diagrammatically;

Fig. 6 is a vertical section thereof;

Fig. 7 is a plan view of a portion of the cooling chamber or tunnel showing the discharge nozzle in position thereon; and Fig. 8 is a side elevation of a modified form of control, shown diagrammatically.

Referring now to the drawings, the reference character 10 designates an apparatus for cooling bakery products which comprises a cooling chamber 11, an endless carrier 12 operating therein, an air conditioning device 13 and a blower 14 for circulating air through the chamber.

The cooling chamber 11 has top and bottom walls 15 and 16, end walls 17 and 18 and side walls 19 and 21. It is provided with a plurality of horizontally arranged partitions or baffles dividing the chamber into a sinuous cooling passage or tunnel 20 through which the endless carrier 12 is conducted, as will presently appear. There are two sets of partitions 22 and 23, respectively. The partitions 22 are rigidly attached to the front end wall 17 and the other set, which, for convenience of illustration, is represented by the single partition 23 is rigidly attached to the rear wall 18 and extends forwardly between the partitions 22. A short partition 24 extends rearwardly from the end wall 17 above the upper run of the endless carrier 12 for directing the air into the exhaust passage, as will presently appear.

Suitable means are provided for conveying the hot bakery products through the sinuous passage formed by the partitions 22 and 23. In the form of construction selected to illustrate one embodiment of the invention, an endless carrier 12 is employed for this purpose. This carrier comprises the links 25, pivoted to the link pins 27, see Fig. 3, from which are suspended the containers 26. These containers are rigidly connected to the link pins 27 and may be tilted as shown in said figure. Since the specific features of the endless carrier constitute no part of the present invention, it is not thought necessary to describe the same further, other than to state— that in the form of construction shown, each container is rectangular and is supported from one upper corner. The container has its upper end and side open and is especially constructed to receive one or more loaves of bread. The shape or form of the container is, of course, varied to suit different products and conditions.

Appropriate means are provided for conducting the endless carrier 12 through the sinuous passage or tunnel formed by the baffles. As shown, pulleys or sprockets 28, 29 and 31 are provided at the end of the baffles 22 and 23. A pair of sprockets 32 and 33 are provided at the front of the chamber 11 for supporting the endless carrier in its passage past the loading and discharge stations 34 and 35, respectively.

The endless carrier, after passing the loading station 34 where the containers 26 are loaded with one or more loaves of bread by the loading mechanism 36, is conducted along rearwardly through the upper portion 37 of the cooling passage above the upper baffle 22 around the sprocket 28, then forwardly through the upper intermediate portion 38 of the cooling passage above the partition 23, then rearwardly through the lower intermediate portion 39 of said passage and finally forwardly through the lower portion 41 of the cooling passage to the discharge station 35 where the bread is automically removed from the containers 26 by any suitable means as the discharge mechanim 42.

The loading and discharging mechanism may be of the usual or any well-known construction, as shown. The loading mechanism 36 comprises an endless carrier 43 which is operated intermittently to convey the loaves 44 from the oven to the loading station. The loaves are advanced until they come opposite the station 34 and are then pushed on to the conveyor or chute 45 by a pusher mechanism 46 which operates in timed relation to the operation of the endless carrier 43 and the main carrier 12. From the conveyor or chute 45 they pass into the containers 26.

At the discharge station the containers are discharged by the mechanism that will now be described. On one end of the link pin 27 to which the container is rigidly attached, is an arm 47 which is adapted to contact a stationary pin 48 at the loading station. The pin 48 will cause the arm to tilt the container 26 to its discharging position and permit the bread to be discharged on to the carrier or chute 49 which conveys the bread to the slicing or wrapping mechanism, not shown.

The endless belt 12 is operated by any suitable mechanism as the motor 40.

Suitable means are provided for circulating air through the tunnel or cooling passage 20. As shown, a fan or blower 14 receives air from the conditioning device 13 and delivers it at the forward lower end of the tunnel or cooling passage 20 in a direction opposite to the direction of the movement of the carrier 12.

It is well known that if cool air be brought into contact with bread fresh from the oven before it has time to cool, the crust of the bread will crack and check, and, while the quality of the bread may not be much impaired, its salability is seriously affected. The present invention seeks to avoid this defect in cooling bakery products in that the cooling air is caused to flow contra to the movement of the endless belt, and hence the coolest air comes into contact with the product immediately before it is discharged from the endless carrier, and by the time the circulating air reaches the portion 37 of the cooling passage 20, it will be heated by the hot bread as it advances along the cooling passage to such a degree as not to unfavorably affect the bread fresh from the oven.

In order to properly advance the air along the passage 20, one or more boosters may be employed. In the construction shown, which is by way of example only, a booster 51 is employed for this purpose. This booster comprises a fan 52 having its intake 53 at the forward end of the portion 39 of the cooling passage, as at 54 and its discharge 55 in the forward end of the portion 38 of the cooling passage 20 as at 56.

In the operation of this device, the air flowing along the portion 39 of the cooling passage is assisted in its movement by the action of the intake of the booster fan or blower 52.

The booster fan may, if desired, be located outwardly of the chamber 11, as shown, although its location is a matter of convenience in constructing the device.

Its object is to assist in moving the air along the cooling passage without having to apply excessive force as would be necessary were a single fan or blower at the intake of the passage employed. Not only is the use of the booster a saving in power necessary for circulating the air but the velocity of the air at the intake of the passage can be much less than where it is not employed and the velocity throughout the passage be kept more nearly uniform to the end that the bakery products will be cooled more evenly thereby obviating checks and cracks in the crust.

It is desirable that the conditions under which the products are cooled be maintained as nearly constant as possible in order that the cooled products may be uniform. If the conditions vary, there will be a corresponding lack of uniformity in the cooled product. For instance, if the moisture in the air passed through the cooling tunnel is below a predetermined amount, too much moisture will be evaporated from the products and the crust will become dry, hard and more or less cracked or checked, and the product will be underweight. If, on the other hand, too much moisture is employed in the cooling air, the product will be soggy and unpalatable. So, too, if the temperature of the cooling air is not uniform, there will be a lack of uniformity in the weight of the cooled product and in the condition of the same.

In the present invention, means are provided for conditioning the air supplied to the blower 14.

In the form of construction shown, the intake 57 of the fan extends to a point exterior of the building for conducting external air to the fan 14. The upper end of the intake passage may be provided with a shield 58 for preventing the entrance of rain and the like. The lower portion of the intake 57 is enlarged, as at 59, for receiving the air conditioning device, which comprises an air cleaner 61, a temperature control device 62 and a humidifier 63. Since these devices are of the usual or any well known construction, they are shown diagrammatically in Fig. 1. They are of the commercial type, and while shown separately, and more or less distinct, two or more may be united in a single unit, as is commonly done in such constructions.

In the normal operation of the device, air passing through the cooling chamber is discharged from the cooling apparatus through the discharge passage 64. This passage may discharge to the exterior of the building, or, if desired in cold weather, it may discharge within the building for warming the same. Since it would be too expensive to recirculate and cool the air, it is normally discharged from the apparatus when used. However, portions are recirculated under certain conditions as will be disclosed presently.

The temperature control mechanism 62 is adapted to maintain the air at a predetermined temperature. The temperature control mechanism may be of any of the usual commercial forms, such, for instance, as the type where the air is caused to flow over or through cooling coils or other devices for cooling it or over heating coils or other devices for heating it.

Suitable means are provided for recirculating a portion of the air so that the heat of the recirculated air will assist in warming the air passing through the intake 57. In the construction shown, thermally controlled mechanism is employed for this purpose.

The air is normally discharged through the passage 64 and a small exhaust fan 65 may be employed for assisting in moving the air along the passage 64. In order to conduct the air from the passage 64 to the intake passage 57, a connecting passage or duct 66 connecting the two passages below the exhaust fan 65 is provided. A valve in the form of louvres 67 is provided in the intake passage beyond or above the connecting passage 66. A similar valve in the form of louvres 68 is provided in the connecting passage or duct 66. Suitable means are provided for automatically operating the louvres 67 and 68. This mechanism is so constructed that when the valve 67 is opened, the valve 68 is closed and vice-versa.

The mechanism that controls the operation of the valves 67 and 68, also controls the operation of the exhaust fan 65 so that when the valve 68 is closed, the fan 65 will be operating for discharging the air from the exhaust passage 64 and when the valve 68 is open, the circuit for operating the fan will be opened. Any suitable mechanism may be employed for this purpose.

As shown, this mechanism comprises a universal motor 69, which is adapted to reciprocate a rack bar 71 for operating the valves 67 and 68. The end of the rack bar 71 has attached thereto a rod 72 which in turn is connected to the arms 73 of the louvres 74 for rotating the same. The louvres 75 of the valve 68 are operated on a similar manner by a bell crank 76. The rack bar 71 also controls a switch 70 for the motor 78 of the fan 65 and the two switches 80 and 90 for the motor 69. The rack has lateral projections 71a and 71b for engaging the spring pressed switches and opening the same when moved toward the right in Fig. 1. Its opposite end is provided with the lateral projection 71c for opening the spring switch 80 when the rack is moved toward the left in said figure.

Located within the enlargement 59 of the intake 57 between the air conditioning device and the fan 14 is a thermostat 77 on controlling the temperature of the air flowing through the intake for the fan 14. In cold weather when the external air inducted through the intake passage 57 is below a predetermined temperature after it passes through the conditioning device 13, the thermostat will engage the contact 78 of the switch which will cause the motor 69 to operate in a direction to cause the rack bar 71 to move to the right, in Fig. 1, which will close the valve 67, open the valve 68 and open the circuit through the motor 78 for stopping said motor. When the air rises above a predetermined temperature, the thermostat will close the circuit at 81 and reverse the operation of the motor 69.

The current for operating the motors 69 and 78 is supplied by the leads 82 and 83.

In Figs. 5, 6 and 7 is shown a modified form of construction in which a different type of conveyor is employed. In this construction, the cooling chamber or tunnel is shown at 84 and comprises a long, narrow tunnel or passage having overhead tracks 85 and 86 therethrough. These tracks are inclined downwardly through the discharge end of the tunnel as shown at 87, whereby the carriers or racks 88 which are suspended from said tracks by suitable hangers 89 will move through said tunnel by gravity. These racks are of the ordinary construction for supporting the bakery products in cooling position. The tracks 85 and 86 converge at each end of the passage 84 into a single return track 91 which passes through a wrapping or slicing chamber 92 and extends back to the loading station 93, thereby forming an endless track for conveying the racks 88 through the cooling chamber, the wrapping chamber and then back to the loading station 93. The racks, after passing by gravity through the cooling chamber, are forced along the external portion of the track 91 to the loading station against the action of gravity in any suitable manner. The cooling chamber or tunnel 84 is provided at its entrance end with a pair of swinging doors 94 and 95 which are adapted to be automatically opened by the racks coming in contact therewith while moving down the tracks 85 and 86 by the action of gravity.

Suitable means are provided for discharging the racks or for permitting the same to be discharged by gravity from the cooling chamber 84. As shown, a pair of pivoted levers 96 and 97 having laterally extending stop members 98 and 99, respectively, are provided for this purpose. These stop members are held in the path of the hangers 89 by suitable springs 101 and 102 which engage the outer ends of the levers 96 and 97. When it is desired that a rack be discharged from the cooling chamber, the attendant operates one or both of the levers 96, 97, by means of cords 90, which moves the stop members 98 or 99 out of the path of the hangers 89. When either of these levers is operated, the corresponding rack at the discharge end of the passage will move by gravity into the chamber 92 and the bakery products are there discharged on to the wrapping or slicing mechanism 103 and 104. The empty rack is then pushed along the track 91 back to the loading station 93 opposite the loading table 105 which is adjacent to the oven 106. The track at the loading station 93 is horizontal so that the rack will remain at said station while it is being loaded. After it is loaded, it is given a shove on to the inclined track 85 or 86 and it will then move by gravity into the cooling chamber into contact with the other racks in said chamber.

Appropriate means are provided for causing a current of air to flow through the chamber 84 for cooling the bakery products. In order that the coolest air shall not come into contact with the bakery products while they are at their highest temperature, provision is made for causing the air to flow contra to the direction of movement of the racks through the cooling chamber, whereby the bakery products are cooled gradually and objectionable cracking and checking of crusts is thus prevented.

Any suitable mechanism is employed for circulating the air through the chamber or tunnel 84. In the form of construction shown, which is by way of example only, this mechanism comprises a fan 107. The discharge passage 108 of the fan is provided with a laterally extending nozzle 109 which is adapted to discharge air through the partition 110 into the discharge end of the chamber 84 inwardly of the swinging doors 111 and 112. The inlet passage for the fan 107 preferably extends to the exterior of the building 113 in which the cooling chamber is located, as shown at 114. The upper end of the passage 114 may be provided with a guard or shield 115 for preventing the entrance of rain and the like into said passage. The front end of the chamber 84 is provided with a discharge passage 116 leading to the exterior of the building 113 through which the cooling air passing through the chamber may be discharged. In order to assist the movement of the air through the chamber 84, a discharge blower or fan 117 may be placed in the discharge passage 116.

Untreated air contains more or less mold spores.

In cooling bakery products with air that has not the proper moisture content, these products, as, for instance, bread, will either be too dry or too moist. If the air is too dry, excess moisture will be evaporated from the loaf, which will not only be below weight when it emerges from the cooling chamber, but the crust will be dry and cracked, rendering the same not only unsalable but unpalatable, as well. If, on the other hand, there is too much moisture in the cooling air, the loaf will absorb excess moisture and will be more or less soggy and unpalatable. In order to standardize the product, it is desirable that means be provided for conditioning the air. This means is the same as that disclosed in Fig. 1 and comprises an air cleaner 118, a temperature control mechanism 119 and a humidifier 121. Suitable means are also provided for sterilizing the cleaned or washed air before it is delivered to the cooling chamber 84. This device is shown diagrammatically at 122 and may be of any commercial type for treating the air with ultra violet ray, ozone or the like. The sterilizing device 112 may be located in the discharge passage 108 of the fan or blower 107, as shown in dotted lines in Fig. 6.

Under certain conditions as in cold weather, it is desirable that air circulated through a cooling chamber 84 be recirculated in order to assist in maintaining the air delivered by the fan 107 to the chamber at a predetermined temperature.

In order to accomplish this function, a construction similar to that previously described is employed, that is, a connecting passage 123 is provided between the intake passage 114 and the discharge passage 116. Valves or louvres 124 and 125 in the passage 114 and 123, respectively, are provided, as in the previous construction. These valves are operated by a thermally controlled mechanism, indicated diagrammatically at 126, which also controls the operation of the fan 117, as in the previous construction. Since this control mechanism is the same as that previously described and operates in the same manner, it is not thought necessary to further illustrate or describe the same.

In the normal operation of the device, air is drawn through the intake passage 114 and the air conditioning device by the fan 107 which forces the same outwardly through the sterilizing device into the discharge end of the chamber 84 and forwardly through said chamber maintaining the same at slightly above atmospheric pressure, whereby the conditioned and sterilized air will also fill the wrapping chamber 92. The fan 117 will assist in moving the air through the chamber 84. During cold weather, when the air passing through the intake passage falls below a predetermined temperature, the thermostat will cause the control device 126 to operate to close the valve or louvres 124, open louvres 125 and stop the fan 117, the same as in the previous construction.

Air, then, will be recirculated through the connecting passage 123 for raising the temperature of the air passing through the fan 107. When the air rises above this predetermined temperature, the valve or louvres 125 will close, those at 124 will open and air will pass from the exterior of the building through the intake passage 114 to the fan 107, as in the previous construction.

While in both forms of the device disclosed, means are provided for shunting the air heated by the products back to the intake of the main circulating fan, it is understood that only a portion of the discharged air may be recirculated, if it is so desired.

In Fig. 8 is shown a modified form of control for the fan 65 and for the louvres 67 and 68, respectively. In this form of construction suitable mechanism is provided whereby when the air entering through the passage 57 becomes too cool, the louvres 67 will be gradually closed and the speed of the fan 65 will be gradually reduced and vice versa. Any suitable mechanism may be employed for this purpose, such, for instance, as the bellows 127.

This bellows is of the well-known commercial type and is adapted to have expansible fluid contained therein for distending the bellows against its resiliency as the temperature rises. This bellows may be placed in the discharge passage of the fan 14. The bellows is connected to an arm 130 of a bell crank 128 by means of a rigid arm 129.

The bell crank 128 has its other arm 131 connected to a rod 133 for operating the louvres 67 and 68. The arm 128 is provided with the moving element or arm 134 of a rheostat 135 for controlling the speed of the fan 65. When the air from the fan 14 rises above the predetermined temperature, the bellows will be expanded against its resiliency, thereby forcing the link 129 upwardly in Fig. 8 which in turn will move the bell crank arm 131, and with it the rheostat arm 134 to the right in said figure, thereby cutting out the resistance in the rheostat and causing the speed of the fan 65 to increase simultaneously with the movement of the crank arm 128 to the right. The louvres 67 and 68 are operated by the rod 133 which corresponds to the rod 72 in Fig. 1. As the rod 133 moves toward the right, the louvers 67 are opened and the louvres 68 are closed. When the temperature of the air within the discharge passage falls below a predetermined temperature, the expansible fluid within the bellows will contract and the resiliency of the metal bellows will cause the latter to contract in length, thereby moving the bell crank 128 in the opposite direction to operate the louvres in the reverse direction. The rheostat arm 134 moving toward the left in Fig. 8 will cut in more and more resistance, thus reducing the speed of the fan gradually as the louvres 67 and 68 are gradually moved in the reverse direction.

While in the different forms of the invention disclosed the temperature of the air passing through the cooling tunnel is maintained at a constant reading automatically by thermo-sensitive means controlled by the temperature of the air entering the cooling chamber, it is understood that the means may be controlled otherwise, for example, by the temperature of the spray water that might be employed for cleaning and cooling the air.

What we claim, therefore, is:

1. A continuously operating apparatus for conditioning bakery products comprising an elongated chamber, a conveyor extending through said chamber and out of said chamber at each end thereof, a loading station for the conveyor outside of the chamber and immediately adjacent an end thereof adapted to receive bakery products fresh from the oven, an unloading station exterior of the other end of the chamber, means for conditioning a quantity of air as to temperature and moisture, means including an entrance duct in the extreme end of the chamber near the unloading station and a discharge duct in the extreme end of the chamber near the loading station for passing said conditioned air through the chamber countercurrent to the direction taken by the products whereby the products, immediately upon entering the chamber, are subjected to the air at its highest temperature and throughout their entire course through the chamber pass progressively through air of decreasing temperature, thermostatically controlled means for causing a portion of the air to be recirculated through said first-named means and for introducing fresh air into said chamber, and one or more boosters along said chamber for assisting in the movement of the air through the chamber.

2. A continuously operating apparatus for conditioning bakery products comprising an elongated passage, a conveyor for conducting said products fresh from the oven through said passage, means for causing fresh air to flow through said passage, an air conditioning device through which said air passes prior to its entry into said passage for conditioning said air as to heat and moisture, and means for causing a portion of said air to be recirculated through said passage when the temperature of the air leaving said device falls below a predetermined minimum.

3. An apparatus for cooling bakery products comprising a cooling chamber, a conveyer for conducting said products through said chamber in one direction, means having an intake in communication with the outside air for conditioning air as to temperature and humidity, means for circulating outside air through said air conditioning means and through said chamber from one end thereof in a direction counter to the movement of said products, a discharge passage for said air at the opposite end of said chamber, and a shunt passage for returning a portion of said circulated air to said intake for reconditioning and recirculating the same and thermostatically controlled means for controlling the amount of air recirculated.

4. An apparatus for cooling bakery products comprising a cooling chamber, a conveyor for receiving bakery products fresh from the oven and conducting the same through said chamber for cooling the same, a device for cleaning, cooling and humidifying the air anterior to its entry into said chamber, a main intake passage for conducting air exterior of said chamber to said air conditioning device, means for causing said air to circulate through said chamber in a direction contra to the direction of movement of said products for cooling said products, a discharge passage extending to the exterior of said chamber, means including a shunt passage for recirculating air through said air conditioning device and chamber, and means controlled by the temperature of the air discharged from said device for controlling the relative amounts of air supplied to said air conditioning device from said shunt and main passages, all air supplied to said chamber by said main and shunt passages passing through said device for conditioning the same.

5. An apparatus for conditioning bakery products comprising a cooling chamber having an inlet and an outlet for warm products fresh from the oven and having air intake and discharge openings, supports for the products in the chamber, air handling means for producing in said chamber between said air intake and discharge openings and while said warm products are in the chamber an air current having a higher temperature adjacent the inlet than adjacent the outlet, means for moving said supports from said inlet to said outlet whereby the warm products entering the chamber are subjected to warmer air than the relatively cool air to which the products leaving the chamber are subjected, said air handling means including an air conditioning device through which said air passes prior to its contact with said products for conditioning said air as to moisture and to a temperature lower than the temperature of said products entering or leaving the apparatus, means including a conduit communicating with said chamber adjacent said inlet for the products and extending to the air conditioning device for causing a portion of said air to be recirculated through said air conditioning device and intake and over said products, and means controlled by the temperature of the air discharged from the conditioning device for controlling the amount of air recirculated.

WADE W. REECE.
LOUIS W. HAAS.